Jan. 21, 1969     L. STARR ET AL     3,423,431
PHOTOLYTIC PROCESS FOR PREPARING POLYCYCLIC
FUSED RING DIANHYDRIDES
Filed Sept. 12, 1966

INVENTORS.
LEON STARR
MICHEL E. MULLIER

United States Patent Office 3,423,431
Patented Jan. 21, 1969

3,423,431
PHOTOLYTIC PROCESS FOR PREPARING POLYCYCLIC FUSED RING DIANHYDRIDES
Leon Starr, Plainfield, and Michel E. Mullier, Princeton Junction, N.J., assignors to Mobil Oil Corporation, a corporation of New York
Filed Sept. 12, 1966, Ser. No. 578,806
U.S. Cl. 260—346.3       9 Claims
Int. Cl. C07d 5/00; C08g 51/80, 30/12

ABSTRACT OF THE DISCLOSURE

Polycyclic fused ring dianhydrides are prepared by exposing (1) maleic anhydride or lower alkyl substituted maleic anhydride and (2) Δ4-tetrahydrophthalic anhydride or an endo group-containing Δ4-tetrahydrophthalic anhydride, wherein the endo group is oxy or lower alkylene, to electromagnetic radiation of a wave length of 2000 to 4000 angstrom units. The compounds are useful as epoxy curing agents, as monomers for making polyimides or polyamide acids, and as plasticizers when reacted with an alcohol.

---

Figure 1:
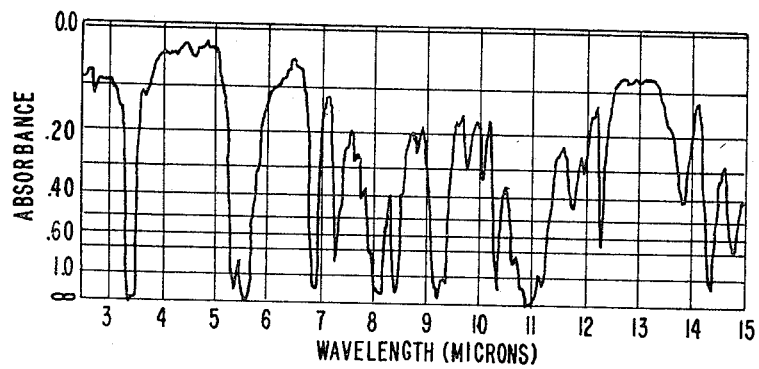

This invention relates to a method of preparing polycyclic, fused ring dianhydrides and to new compounds prepared thereby. The compounds are useful as epoxy curing agents, as monomers for making polyimides or polyamide acids, as monomers for making polyesteramide or polyesteramide compositions, and as plasticizers when reacted with an alcohol.

Essentially, the method comprises exposing to electromagnetic radiation of a wave length of 2000 to 4000 angstrom units a solution containing (1) an unsaturated anhydride selected from maleic anhydride and a substituted maleic anhydride, and (2) a fused ring unsaturated anhydride selected from tetrahydrophthalic anhydride, and endo group-containing tetrahydrophthalic anhydride, and derivatives thereof. There is formed a polycyclic, fused ring dianhydride which is suitably recovered.

Regarding the first noted reactant, maleic anhydride is preferred. The substituted maleic anhydrides include alkyl and halogen derivatives of maleic anhydride, and may be defined, structurewise, as follows:

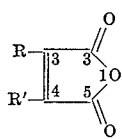

(I)

where R or R' is hydrogen, lower alkyl, phenyl, substituted phenyl or halogen like chloro, bromo, and iodo. By "lower alkyl" is meant an alkyl group having 1 to 5 or 6 carbons. The substituents in the substituted phenyl group are preferably lower alkyl and halogen, as just defined.

The second reactant, i.e., the fused ring anhydride, is a compound comprising an at least partially unsaturated 6 membered ring condensed or fused to a molecule of maleic anhydride at the 3 and 4 positions of the latter. The 6-ring unsaturation is preferably mono unsaturation. The compound is specifically illustrated by tetrahydrophthalic anhydride (II):

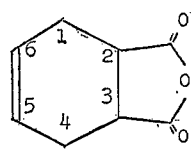

(II)

Other suitable compounds comprise endo group-containing tetrahydrophthalic anhydride like 1,4-endoxy-delta⁵-tetrahydrophthalic anhydride (III) where the endo group is oxy, or 1,4-endomethylene-delta⁵-tetrahydrophthalic anhydride (IV) where the endo group is methylene. Compound (III) is also known as 7-oxabicyclo[2.2.1]hept-5-ene-2,3-dicarboxylic anhydride, and has the following structural formula:

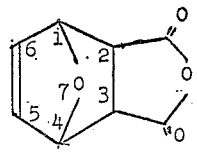

(III)

It may be prepared by reacting furan with maleic anhydride, as illustrated in Example 1. Compound IV is also known as bicyclo[2.2.1]hept-5-ene-2,3-dicarboxylic anhydride and has the following structural formula:

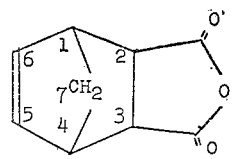

(IV)

The endomethylene group of (IV) is illustrative, it being understood that it can be replaced by an endoalkylene group of low molecular weight, preferably of up to 4 or 5 carbons. Also, the endo group may be sulfonyl, —SO$_2$—. Each of compounds (II), (III), or (IV) may be substituted preferably at the 5 and/or 6 positions by R and/or R' where R or R' is hydrogen, lower alkyl, or halogen, these groups being as defined above. The same groups may also be substituted at the 1, 2, 3, and/or 4 positions. It will be noted that in each compound the anhydride group is removed from the internal double bond of the 6-ring. Each compound is a cyclic olefin.

The two reactants are simply mixed together and photochemically reacted by exposing the mixture to electromagnetic radiation consisting essentially of one or more wave lengths in the range of 2000 to 4000 angstrom units. The preferred radiation is ultraviolet having a wave length in the range of 2000 to 3850 angstrom units. Any suitable source of radiation may be used, preferably a conventional photochemical lamp like Hanovia, Type A, of 550 watts, or a Delmar Scientific Laboratories lamp, model DM–580; and the like. During application of the radiation, it is preferred to maintain the mixture at or near room temperature, and if necessary, cooling is used. The time of exposure is variable but generally may extend from a period of a few seconds up to several hours. A suitable time period may be determined by a trial run or two in the case of any given reactants. Preferably the reactants are dissolved in a suitable solvent before exposure to the radiation, and preferably too a conventional photosensitizer is present to aid in securing an increased yield. Suitable solvents include aliphatic ketones like methyl ethyl ketone, diethyl ketone, methyl isobutyl ketone, and the like; also dioxane, tetrahydrofuran, acetone, cyclohexanone, etc. The solvent should preferably dissolve the photosensitizer as well as the reactants, and it should absorb little or none of the radiation. Photosensitizers include alkyl aryl ketones like acetophenone (a preferred material) and substituted acetophenones; diaryl ketones like benzophenone, chlorobenzophenone; alkylbenzophenones like methyl benzophenone, ethylbenzophenone, etc.; dialkyl benzophenones like dimethyl benzophenone, diethylbenzophenone, etc.; hydroxybenzophenone.

As illustrated by the examples, when maleic anhydride is reacted with a compound of the type illustrated by (II), (III), and (IV), the result comprises a cycloaddition of the maleic anhydride to the isolated double bond of the 6-ring of the fused ring anhydride. This same result obtains when the reactants are substituted as described.

The dianhydride products of the invention may be reacted with aromatic and aliphatic diamines to form high molecular weight polyamide-acids, which upon heating, are converted to polyimides. These polyamide-acids and polyimides are useful to form thermally stable cast films; also coatings as for wire; and various molded articles. When heated with polyepoxide compounds, the dianhydrides serve as curing agents to provide epoxy resins having high heat distortion temperatures and good thermal stability.

The invention may be illustrated by the following examples.

Example 1

A maleic anhydride-furan adduct was prepared by mixing together 19.6 g. of the anhydride with 13.6 g. of furan in 100 ml. of diethyl ether. The reaction mixture is kept at 25° C. for 2 hours. A quantitative yield of adduct is recovered by crystallization. The adduct is 7-oxabicyclo [2.2.1]hept-5-ene-2,3-dicarboxylic acid anhydride. Then a solution was prepared comprising 16.7 g. of the adduct, 9.8 g. of maleic anhydride, and 4.5 g. of acetophenone as sensitizer in 150 ml. of methyl ethyl ketone. The solution was placed in a quartz test tube and irradiated for 5 hours at 25° C. with ultraviolet radiation, using a Hanovia 450-watt, high pressure, mercury vapor lamp as the source of radiation. There were recovered from the solution 1.27 g. of an insoluble white solid. This material began to decompose at 410° C.

Analysis for $C_{12}H_8O_7$.—Calculated: C, 54.50; H, 3.03. Found: C, 54.55; H, 3.40. Molecular weight by titration, 270; theoretical, 264. The material was soluble in hot acetone and did not decolorize permanganate solution. The material was dissolved in mineral oil (Nujol), and its infrared absorption pattern determined in a Perkin-Elmer model 137B infrared spectrophotometer, with the result shown in FIG. 1, where absorbance of the material is plotted against the wave length in microns of the infrared radiation. The absorbance is the reciprocal of the transmittance, and the latter is equal to log $I_0/I$, where I is the amount of infrared radiation coming from the reference beam and falling on the sample. In the curve of FIG. 1, the dips represent absorption bands. The following characteristic maxima in the infrared region, in microns, are noteworthy; 3.40, 3.50, 5.55, 6.84, 7.28, 8.10, 8.40, 8.80, 9.20, 9.77, 10.04, 10.34, 10.90, 11.19, 11.78, 11.99, 12.32, 13.84, 14.37, and 14.79. When the same reaction was run in the absence of the sensitizer, the yield of product was only 0.29 g. The material was identified as 9 - oxatricyclo - [4.2.1.0$^{2,5}$]nonane-3,4,7,8-tetracarboxylic acid dianhydride.

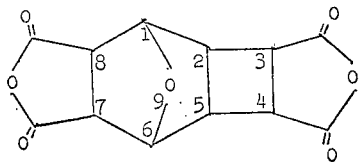

(V)

Example 2

A solution was prepared comprising 12.3 g. of maleic anhydride, 19.3 g. of tetrahydrophthalic acid anhydride, and 1.68 g. of benzophenone as sensitizer in 125 ml. of methyl ethyl ketone. The solution was irradiated for 24 hours at 25° C., using the procedure of Example 1. There were recovered 0.92 g. of an insoluble white solid. This material began to decompose at 260° C.

Figure 2:
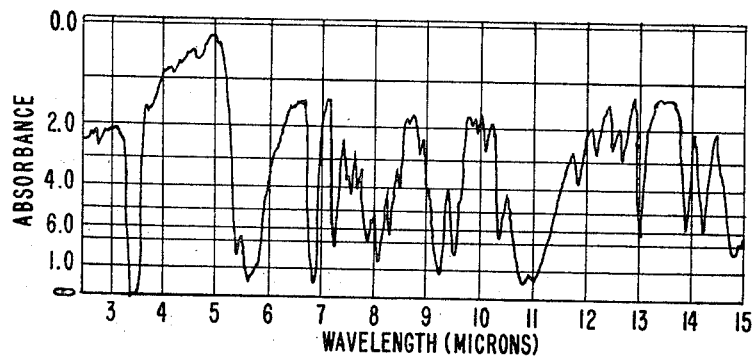

Analysis for $C_{12}H_{10}O_8$.—Calculated: C, 57.60; H, 4.00. Found: C, 57.96; H, 4.26. Molecular weight by titration, 240; theoretical, 250. The material was slightly soluble in hot acetone and did not decolorize permanganate solution. The IR spectrum is shown in FIG. 2, and was obtained as set forth in Example 1. The following characteristic absorbance maxima in the infrared region, in microns, are of note: 3.40, 5.63, 6.85, 7.26, 7.90, 8.10, 8.31, 8.49, 8.68, 8.86, 9.23, 9.52, 10.08, 10.40, 10.84, 11.07, 11.85, 12.19, 12.54, 12.70, 13.02, 13.94, 14.24, and 14.80. When the same reaction was run in the absence of the sensitizer, the yield of product was only 0.15 g., and with 4.5 g. of acetophenone as sensitizer the yield was 1.1 g. The material was identified as bicyclo[4.2.0]octane-3,4,7,8-tetracarboxylic acid dianhydride:

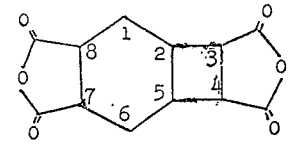

(VI)

Example 3

A solution was prepared comprising 20.6 g. of nadic anhydride, i.e., bicyclo[2.2.1]hept-5-ene-2,3-dicarboxylic acid anhydride, 12.3 g. of maleic anhydride, and 2.3 g. of benzophenone as sensitizer in 125 ml. of methyl ethyl ketone. The solution was irradiated for 24 hours at 25° C. as in Example 1, there being recovered 0.1 g. of a white solid. This material decomposed at 315° C.

Figure 3:
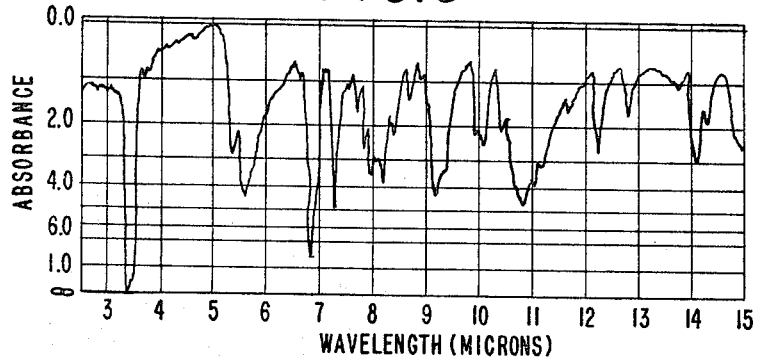

Analysis for $C_{13}H_{10}O_6$.—Calculated: C, 59.60; H, 3.82. Found: C, 59.40; H, 4.02. Molecular weight by titration, 245; theoretical, 262. The material was slightly soluble in hot acetone and did not decolorize permanganate solution. The IR spectrum is shown in FIG. 3, from which the following absorbance maxima may be noted: 3.42, 5.61, 6.85, 7.28, 7.95, 8.20, 8.41, 8.71, 8.90, 9.19, 10.10, 10.41, 10.85, 11.00, 11.18, 11.70, 12.24, 12.81, 13.80, 14.10, and 14.31. An amount of 1.6 g. of this same product was recovered after irradiation for 70 hours at 25° C. using 4.5 g. of acetophenone as sensitizer. The material was tricyclo - [4.2.1.0$^{2,5}$]nonane - 3,4,7,8-tetracarboxylic acid dianhydride:

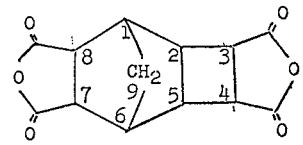

(VII)

Example 4

To illustrate the use of the dianhydrides for the preparation of polyamide-acids, the dianhydride product of Example 3 may be reacted with an aromatic diamine like oxydianiline. Thus, 5.24 g. (0.02 mole) of dianhydride is added to a solution of 4.0 g. (0.02 mole) of oxydianiline in 50 g. of dimethyl acetamide. The reaction mixture is stirred at 80° C. until the solution viscosity is constant. The polyamide-acid can be precipitated from solution by the addition of a nonsolvent such as acetone, and the polymer is collected and dried. Films of the polymer are cast from dimethyl acetamide solutions and are transformed into polyimides by heating at 150° C.

Example 5

The dianhydrides may be used as epoxy curing agents by simply dissolving the same in the epoxy resin. For example, 25 g. of Epon 828 (a liquid epoxy resin having an epoxide equivalent of 1 mol per 200 g. of resin and prepared by reacting epichlorhydrin with 2,2-bis(4,4'-hydroxyphenyl)propane) are heated at 170° C. for 15 minutes in a glass vessel, with stirring, with 8.9 g. of the dianhydride of Example 3. A clear solution results which on pouring into a glass dish gels; this can be cured to a hard, tough material by heating in an oven for 16 hours at 200° C.

It will be understood that the invention is capable of obvious variations without departing from its scope.

In the light of the foregoing description, the following is claimed.

We claim:
1. 9 - oxatricyclo - [4.2.1.0$^{2,5}$]nonane-3,4,7,8-tetracarboxylic acid dianhydride.
2. Bicyclo[4.2.0]octane-3,4,7,8-tetracarboxylic acid dianhydride.
3. Tricyclo - [4.2.1.0$^{2,5}$]nonane - 3,4,7,8-tetracarboxylic acid dianhydride.
4. Process for making the dianhydride of claim 1 which comprises exposing to electromagnetic radiation of a wave length of 2000 to 4000 angstrom units a solution containing maleic anhydride and 7-oxabicyclo[2.2.1]hept-5-ene-2,3-dicarboxylic anhydride, thereby forming said dianhydride.
5. Process for making the dianhydride of claim 2 which comprises exposing to electromagnetic radiation of a wave length of 2000 to 4000 angstrom units a solution containing maleic anhydride and Δ4-tetrahydrophthalic anhydride, thereby forming said dianhydride.
6. Process for making the dianhydride of claim 3 which comprises exposing to electromagentic radiation of a wave length of 2000 to 4000 angstrom units a solution containing maleic anhydride and bicyclo[2.2.1]hept-5-ene-2,3-dicarboxylic anhydride, thereby forming said dianhydride.
7. A process for making a polycyclic, fused ring dianhydride which comprises exposing to electromagnetic radiation of a wave length of 2000 to 4000 angstrom units a solution containing (1) an unsaturated anhydride selected from maleic anhydride and a lower alkyl ($C_1$–$C_5$) substituted maleic anhydride and (2) an unsaturated anhydride selected from Δ4-tetrahydrophthalic anhydride and an endo group-containing Δ4-tetrahydrophthalic anhydride, wherein the endo group is selected from oxy and lower ($C_1$–$C_4$) alkylene, thereby forming said dianhydride.
8. Process of claim 7 wherein said solution contains a photosensitizer comprising an aromatic compound having a carbonyl group attached to the aromatic ring.
9. The process of claim 8, wherein said sensitizer is selected from acetophenone and benzophenone.

References Cited

UNITED STATES PATENTS 3,299,102   1/1967   Bradshaw _____ 260—346.3

ALEX MAZEL, *Primary Examiner.*

BERNARD DENTZ, *Assistant Examiner.*

U.S. Cl. X.R.

260—2, 31.8, 78; 204—162